(No Model.)

J. F. STEPHENSON.
APPARATUS FOR AUTOMATICALLY REMOVING SOLID MATTER FROM WATER OR ANALOGOUS LIQUIDS.

No. 580,561.            Patented Apr. 13, 1897.

Witnesses
Chas. H. Smith
Geo. T. Pinckney

Inventor
J. F. Stephenson
per L. W. Serrell & Son
Attys

THE NORRIS PETERS CO., PHOTO-LITHO., WASHINGTON, D. C.

UNITED STATES PATENT OFFICE.

JOHN FOSTER STEPHENSON, OF GLENFERRIE, HAWTHORN, VICTORIA.

APPARATUS FOR AUTOMATICALLY REMOVING SOLID MATTER FROM WATER OR ANALOGOUS LIQUIDS.

SPECIFICATION forming part of Letters Patent No. 580,561, dated April 13, 1897.

Application filed September 4, 1896. Serial No. 604,852. (No model.) Patented in Victoria August 7, 1895, No. 12,387.

*To all whom it may concern:*

Be it known that I, JOHN FOSTER STEPHENSON, a subject of the Queen of Great Britain, and a resident of Cranmore Street, Glenferrie, Hawthorn, in the Colony of Victoria, have invented a certain new and useful Improved Apparatus for Automatically Removing Solid Matter from Water or Analogous Liquids, (for which Letters Patent of the Colony of Victoria, No. 12,387, and dated the 7th day of August, 1895, have been granted to me,) of which the following is a specification.

This invention has been devised for the purpose of providing an improved apparatus for use in connection with waterworks, streams, channels, &c., where it is desirable to remove foreign, solid, or floating matters from the water before the latter is led away for consumption.

At present it frequently happens that large quantities of dead leaves, grass, and other organic matters and earths become mixed with the water in creeks, lagoons, reservoirs, and the like places, and it is desirable that such water should be freed from these impurities. It also happens in mining operations that for economical purposes the same water or liquid should be utilized repeatedly to perform its work—as, for instance, where water has been surcharged with tailings from a crushing-battery, where such water is of considerable value, it is necessary that the liquid should be used over and over again. Again, in wool or fiber washing operations it is desirable to save any fragments of such wool or fiber as may have escaped with the waste water.

Now my invention fulfils all the functions necessary to satisfy the above requirements in an efficient and highly-economical manner, my improved automatic apparatus acting as a general cleanser of water or other similar liquid when such water or liquid is charged with any solid or foreign matters which will not pass through a finely-divided screen or gauze.

In order that my invention may be the better understood, reference may be made to the acccompanying drawings, in which—

Figure 1:
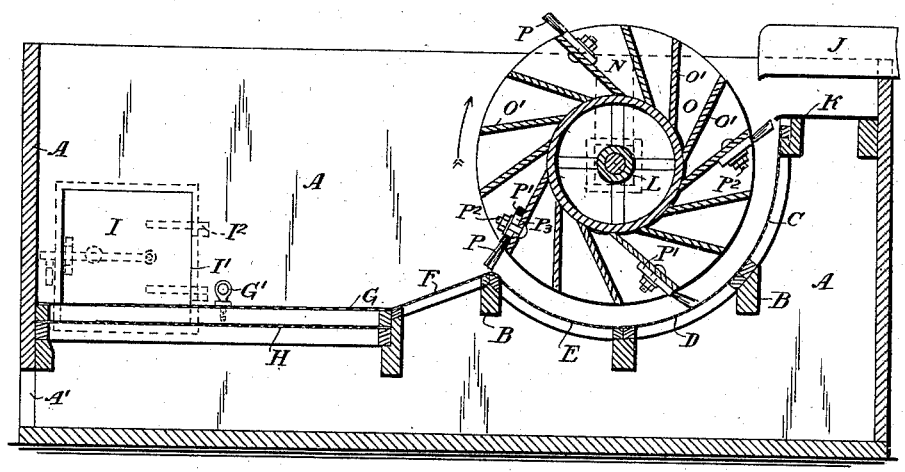
Figure 2:
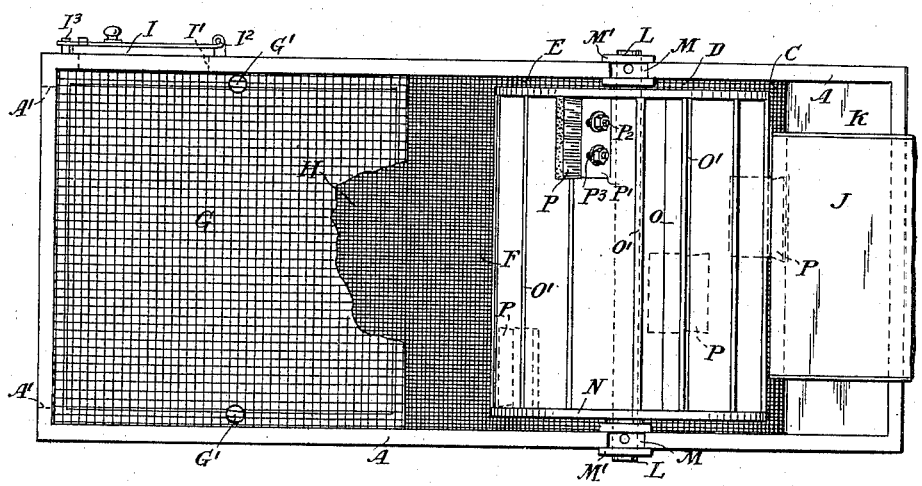

Figure 1 illustrates a longitudinal sectional elevation of my improved apparatus, while Fig. 2 is a plan of same, with a portion torn away for clearness of reading.

Similar letters in both the views refer to corresponding parts.

In the drawings, A represents a rectangular casing or box somewhat in the form of a parallelogram, preferably constructed of wood and provided with stout water-tight joints and bottom. In this casing A are arranged a number of conveniently-placed lateral beams, as B, arranged in any suitable manner to support curved segmentary screens C, D, and E, (see Fig. 1,) said segmentary screens forming part of a circumference of which a horizontal shaft L is the center. The upper faces of these screens are covered with fine wire-gauze or other suitable screening material, their under sides being open to the lower portion of the box A.

F is also a screen, similar in all but shape to the screens C D E and forming an inclined step down to a flat-framed screen G. This latter screen G has a larger gage than the preceding screens and is designed to form a receptacle upon which leaves, grass, or similar matters may collect and finally drain off their contents. This screen G (a portion of which on Fig. 2 has been torn away to show the under screen H) may be removed from its place by the eyelets G' G', Figs. 1 and 2, and when in position its frame rests upon a lower screen H, formed of similarly fine gauze to those before described.

A' is an open passage or exit-duct for the liquid which falls into the box A, and is preferably placed, as shown, at the bottom of said casing A, its width being shown by the dotted lines at A' A' on Fig. 2.

I is a door closing an opening I' in the side of the casing A. This door I may be provided with hinges I² and fastening-latch I³.

J is a spouting or chute by which the liquid charged with the matters desired to be removed enters the apparatus. J is supported, as shown, by the casing A; but I desire it to be understood that J may be moved a short distance backward or forward, in accordance with the volume and velocity of liquid pouring through it into the apparatus.

K is a shelf, preferably constructed of metal and terminating in a downwardly-pointing edge. The use of K will be hereinafter explained.

L is a horizontal shaft, preferably constructed of metal and revolving at each end in a bearing M. To this shaft L is keyed or otherwise attached a water-wheel N, as shown. In this wheel are full-length lateral buckets O, said buckets being constructed of wooden planks O'. To some of these planks O' body-plates P' of flat brushes P are attached, the plates P' being kept in position by nutted bolts P², said bolts passing through adjusting-slots P³, formed in the said plate P'.

It will be seen from the drawings that the shaft L is free to revolve in the bearings M M. These latter are formed with flanges M', fitted in slotted vertical passages in the casing A in such a manner that the whole of L, the wheel N, and the bearings M may be raised to a convenient distance (see Fig. 1) to permit the screens C, D, and E to be lifted up and removed from their position shown on the drawings.

The *modus operandi* of my invention is as follows: Presume that water is to be cleansed from leaves, grass, insects, and the like. The liquid enters my apparatus by the spouting or chute J and wholly or partly pours into one or more of the lateral buckets O. This action will set the wheel N into rotary motion, the buckets meanwhile filling and discharging their contents against and over the screens C, D, and E, and, to a less extent, F. The liquid immediately filters away through the strainers C, D, and E, leaving a deposit of the before-mentioned impurities, such as animal or vegetable matters, upon the face of the said screens. These matters are quickly removed from the faces of the screens by the cleaning or sweeping action of the brushes P in their revolution with the wheel, as shown on Fig. 1. It will be noticed that these brushes (see Fig. 2) are set alternately, so as to slightly overlap one another's work and so calculated that with one revolution of the wheel N the brushes collectively will have swept the whole of the surfaces of C, D, and E. In practice the wheel revolves at some considerable speed and causes the said brushes P to eject all the collected matter from C, D, and E onto the wider-gage screen G. Here the leaves or other matter can roughly drain before being removed. This is effected by opening the door I and raking such matters out with any convenient instrument. From time to time the eyelets G' G' may be utilized and the screen G lifted out for cleaning or repairs. Any finer matters which may have fallen through the larger orifices in the screen G can then be conveniently removed from the lower and finer screen H. The liquid, after having found its way through the gauze screens C, D, and E, passes along to and out of the open passage or exit A'.

Reverting to the spouting or chute J, if the supply and velocity of liquid be very considerable the said chute should be moved backward, so that its contents will fall onto the shelf K and from thence into the buckets O. This alteration may be necessary in order to prevent any excessive velocity or volume of the liquid from causing the wheel to revolve in the wrong direction, the desired object of the arrangement of the chute J and shelf K being to direct the incoming liquid so as to fill the buckets O, that their weight may revolve the wheel N in the direction shown by the arrow.

When my apparatus is used in connection with water charged with tailings from a crushing-battery, all the screens C, D, E, F, G, and H are covered with a finer gauze than that used at the crushing-battery through which the tailings have passed.

Having now particularly described and ascertained the nature of my said invention and in what manner the same is to be performed, I declare that what I claim is—

1. The combination with the stationary curved screen and the inlet-chute, of a water-wheel having buckets against which the liquid acts to rotate the same, and brushes projecting from the edges of the buckets and acting against the curved surface of the screen substantially as specified.

2. The combination with the stationary curved screen and the inlet-chute, of a water-wheel having a central shaft, end heads and inclined buckets forming receptacles for the liquid for rotating such wheel, and brushes projecting from the edges of the buckets and acting against the curved surface of the screen, substantially as specified.

3. In apparatus for automatically removing solid matter from water or other liquid, in combination one or more curved screens as C D E, inclined screen as F, and screens as G and H, brushes as P, and water-wheel as N, casing as A and an inlet-chute as J and K, substantially as and for the purposes set forth.

4. In apparatus for automatically removing solid matter from water or other liquid, in combination a water-wheel as N brushes as P, bolts P² and slots P³ for adjusting same, the said wheel being supported in bearings as M capable of being raised and lowered substantially as and for the purposes set forth.

Signed at Melbourne this 13th day of July, 1896.

JOHN FOSTER STEPHENSON.

Witnesses:
A. O. SACHSE,
C. HARKER.